(12) United States Patent
Vidal (10) Patent No.: US 7,897,091 B2
(45) Date of Patent: Mar. 1, 2011

(54) METHOD AND ASSOCIATED DEVICE FOR MANUFACTURING APICULTURE HONEYCOMBS

(75) Inventor: Carlos Ferrer Vidal, Barcelona (ES)

(73) Assignee: Breat, S.L., Gava (Barcelona) (ES)

( * ) Notice: Subject to any disclaimer, the term of this patent is extended or adjusted under 35 U.S.C. 154(b) by 0 days.

(21) Appl. No.: 12/593,669

(22) PCT Filed: Feb. 1, 2008

(86) PCT No.: PCT/ES2008/000054
§ 371 (c)(1),
(2), (4) Date: Sep. 29, 2009

(87) PCT Pub. No.: WO2008/119847
PCT Pub. Date: Oct. 9, 2008

(65) Prior Publication Data
US 2010/0102486 A1 Apr. 29, 2010

(30) Foreign Application Priority Data
Mar. 30, 2007 (ES) .................................. 200700845

(51) Int. Cl.
*B29C 43/48* (2006.01)
*B29C 43/50* (2006.01)

(52) U.S. Cl. ............. 264/313; 264/334; 425/3; 425/371; 425/440

(58) Field of Classification Search .................. 264/213, 264/214, 313, 334; 425/3, 371, 440, 436 RM; 449/2, 42
See application file for complete search history.

(56) References Cited

U.S. PATENT DOCUMENTS

| 3,582,036 A | 6/1971 | Condis |
| 3,860,368 A * | 1/1975 | Kerttula et al. .................... 425/3 |
| 6,340,324 B1 | 1/2002 | Vidal |
| 6,358,340 B2 * | 3/2002 | Ferrer Vidal .................... 156/61 |

FOREIGN PATENT DOCUMENTS

ES 2 173 774 A1 10/2002

OTHER PUBLICATIONS

International Search Report (PCT/ISA/210) for PCT/ES2008/000054 mailed Jun. 11, 2008.

* cited by examiner

*Primary Examiner* — Richard Crispino
*Assistant Examiner* — Robert Dye
(74) *Attorney, Agent, or Firm* — Buchanan Ingersoll & Rooney PC (57) ABSTRACT

The method comprises differentiated separation of the strips holding the silicone cores with respect to the honeycomb produced, by simply curving one of the strips corresponding to one of the faces of the honeycomb and by progressive action of pulsed magnetic fields in the other of the strips holding the silicone cores, progressively separating the honeycomb and preventing breakages in the walls of the same. In a device equipped with an alignment of electromagnets which act on the strip bearing the elastic cores to be separated and which exert an action of pulsed magnetic fields on the same, progressively separating the strip from the honeycomb.

6 Claims, 8 Drawing Sheets

METHOD AND ASSOCIATED DEVICE FOR MANUFACTURING APICULTURE HONEYCOMBS

This invention is intended to disclose a method and its associated device for manufacturing apiculture honeycombs, providing notable improvements with respect to the prior art.

The present Applicant has previously produced several inventions relating to the manufacture of apiculture honeycombs, with the aim of assisting the natural work of the bees in the preparation of their own honeycombs, by mechanical and industrial methods in which the honeycombs are manufactured by means of liquid wax which is introduced into suitable moulds in the form of laminar bands or bands of resilient material with shaping cores, which move on rollers forming a closed circuit so that, in a continuous manner, the wax is poured at one end of the apparatus, the honeycombs are shaped as the liquid wax is introduced between the cores of the laminar elements and the honeycomb is gradually cooled until, on reaching the outlet of the apparatus, it is separated and cut, making it possible to obtain a synthetic honeycomb element which will serve for filling the beehives. This technology is what the inventor disclosed in Spanish Patents 9600019, 9701564 and Patent of Addition 9801156.

However, while attempting to slim down the walls of the honeycomb to a greater degree in order to approximate them to the values of natural honeycombs, problems of breakage of the walls of the cells arose, so that the inventor proceeded to carry out tests and trials in order to obtain wax honeycombs with very thin walls while at the same time avoiding breakage thereof, thereby achieving the present invention.

In order to achieve its aims, the present invention comprises a method for manufacturing wax apiculture honeycombs which comprises subjecting the bands holding the resilient moulds, during their movement from the point of entry of the wax to the point of discharge of the manufactured honeycombs, to differentiated separation of the bands holding the resilient cores in a manner which leads, independently, to the separation of the lower band simply by curving it, on the end roller, separating it from the manufactured honeycomb, and carrying out a completely different separation method for the upper band, which is subjected to pulsed magnetic fields along its travel. In this way, on the one hand the separation of the lower band is obtained without breakage of the thin walls of the honeycomb, and on the other hand the progressive separation of the upper band is obtained by the effect of the pulsed magnetic fields. In this way a considerable improvement has been made in the manufacture of the honeycombs, both in the reduction of the thickness of the walls which it has allowed, and also by avoiding breakage of the walls. The method also comprises the inclusion of iron powder into the resilient cores which form part of the upper and lower continuous bands of the machine, so that the magnetic effect of the pulsed fields becomes more effective.

The apparatus for the execution of the method of the invention comprises the arrangement of a plurality of consecutive sets of electromagnets that are disposed along the final part of the path of the upper band or band and, preferably, are placed parallel with their core perpendicular to the direction of advance of the band. Each magnet assembly comprises an elongate central core and two lateral supports with a specific separation and with a length approximated to the width of the strip which has on its outer face the band holding the resilient cores. The lateral supports are in continuous contact with the strip of the upper band, while the central core or electromagnet is slightly separated, in order to allow the tractive action to result in a substantial and short curvature of the strip. Said short and relatively substantial curvature is necessary in order to effect the separation of the honeycomb being manufactured with respect to the resilient cores, since a very smooth curve would not allow the separation of the panel with respect to the resilient silicone cores in view of the flexibility of the wax. The magnetic field flows from the lateral supports towards the central core, passing through the strip of the upper band and also through the silicone cores with iron powder. The device comprises elements for the cooling of the components of the electromagnet.

For greater understanding thereof, some drawings showing a preferred embodiment of the present invention are appended by way of non-limiting example.

Figure 1:
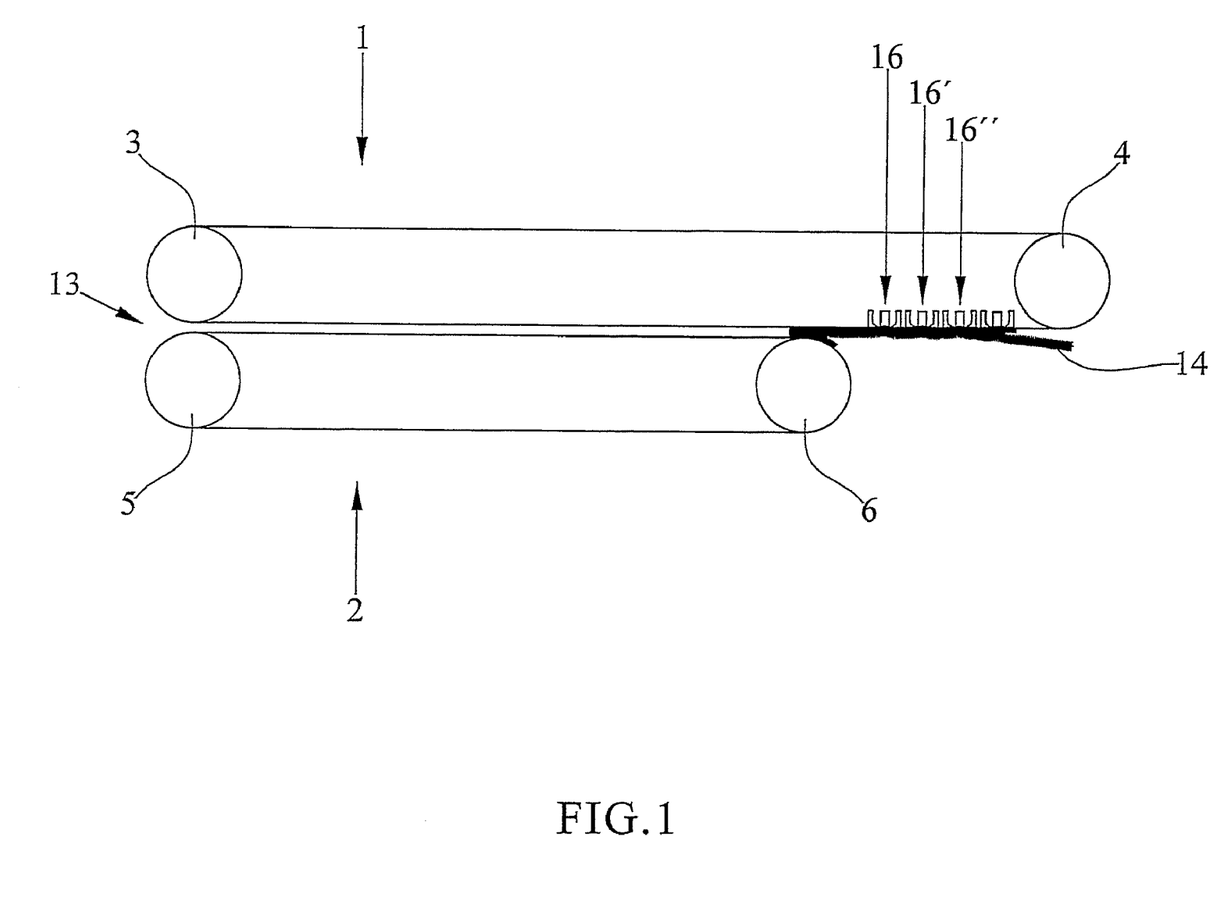
FIG. 1 shows a schematic view of the device intended to execute the method of the invention.
Figure 2:
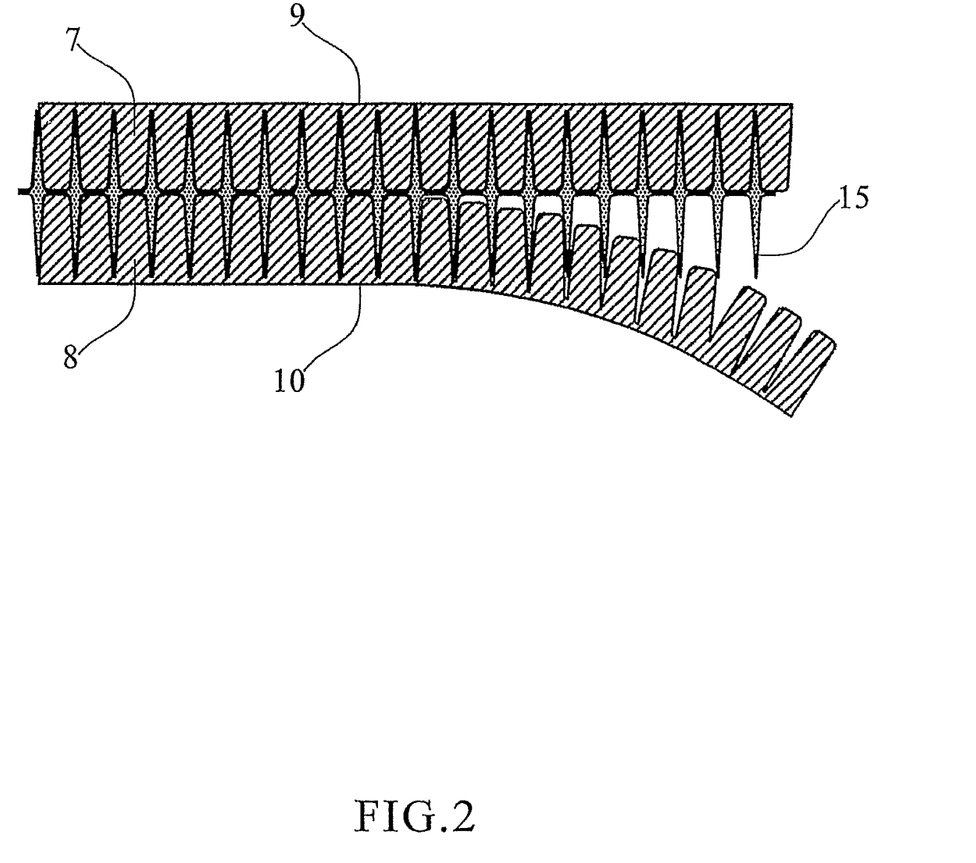
FIG. 2 shows schematically the separation of the metal band holding the silicone cores corresponding to the lower face of the honeycomb.

As shown in the drawings, the manufacture of the honeycombs takes place, as was disclosed in the previous patents of the Applicant, by means of continuous bands 1 and 2 of an elastomer such as silicone or the like that are mounted on respective pairs of rollers 3, 4 and 5, 6, said bands being provided with respective pluralities of cores forming the honeycombs, such as those shown in FIG. 2 by the reference numbers 7 and 8. Said bands 1 and 2 have on their outer faces respective metal strips 9 and 10. The method comprises the feeding in of the liquid wax from the end 13 and the exit of a continuous honeycomb 14 from the other end and which will be cut to the desired length.

Figure 3:
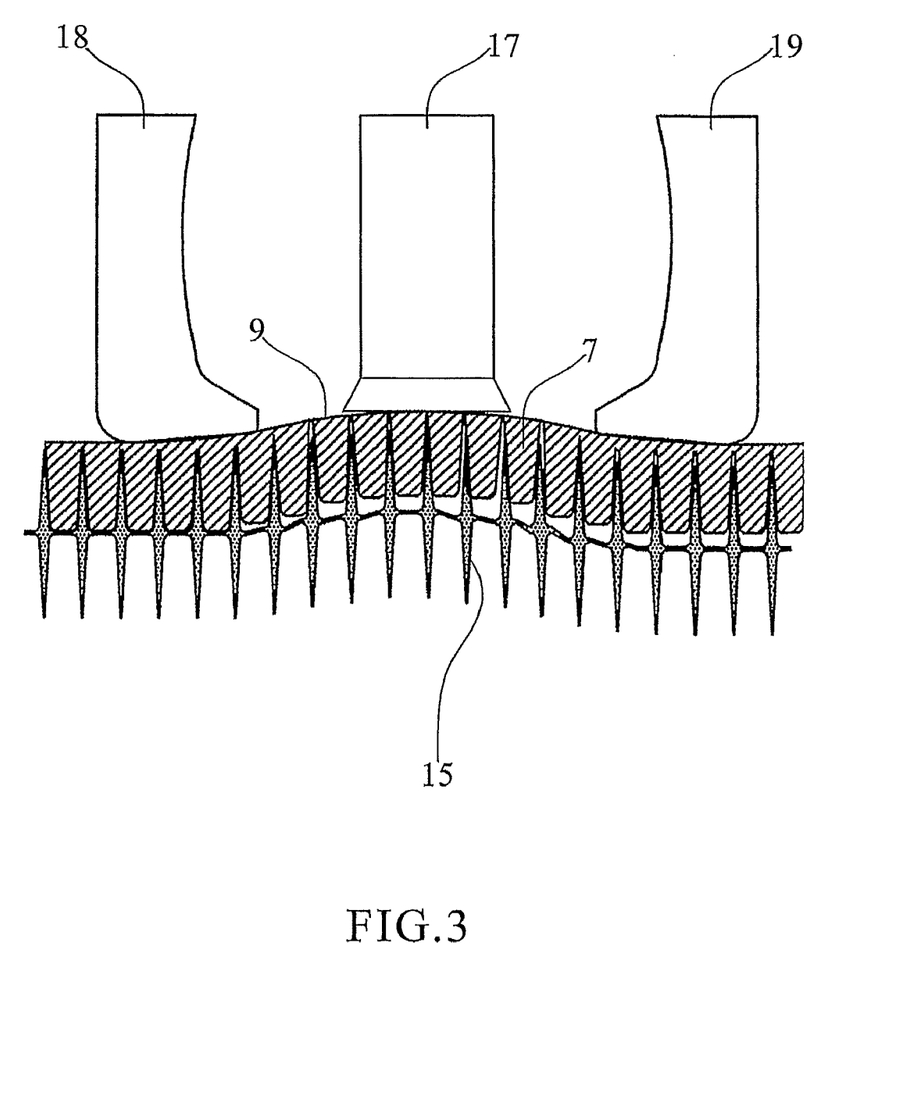
FIGS. 3, 4 and 5 show respective schematic views of the progressive action of the pulsed electromagnets for the extraction of the upper band.
Figure 4:
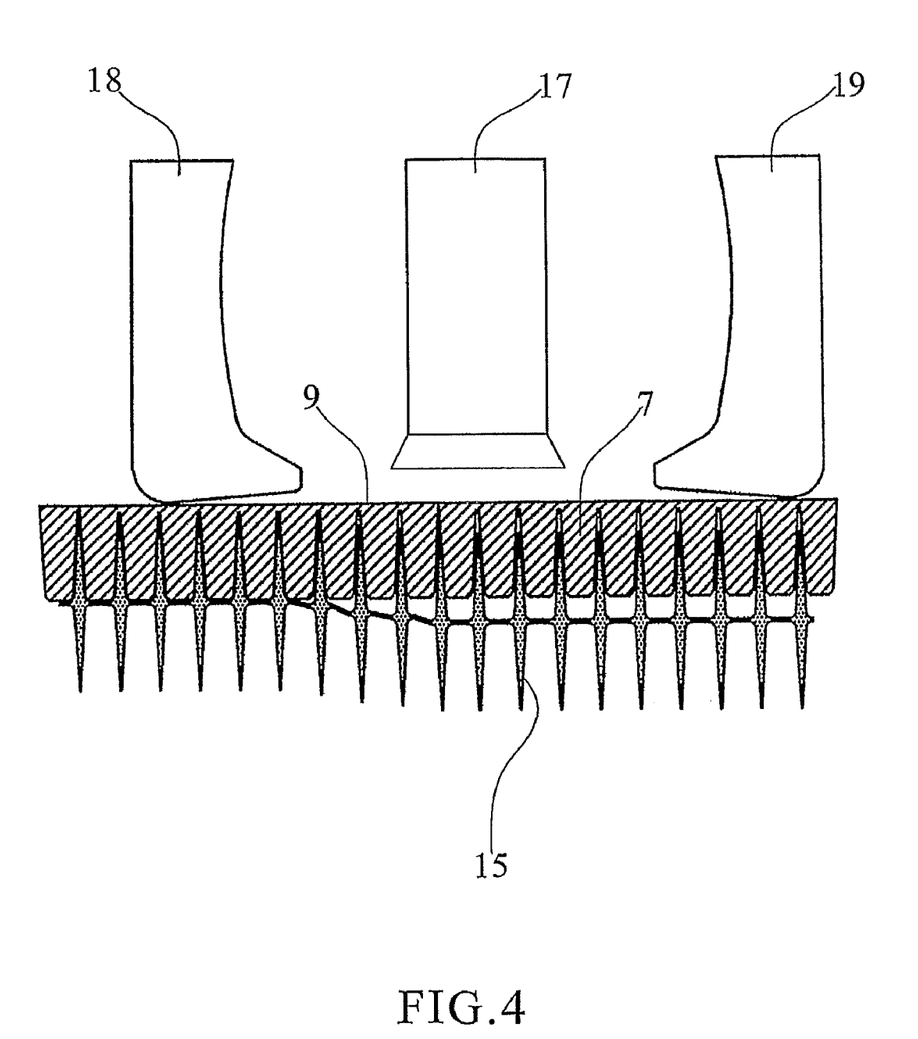
Figure 5:
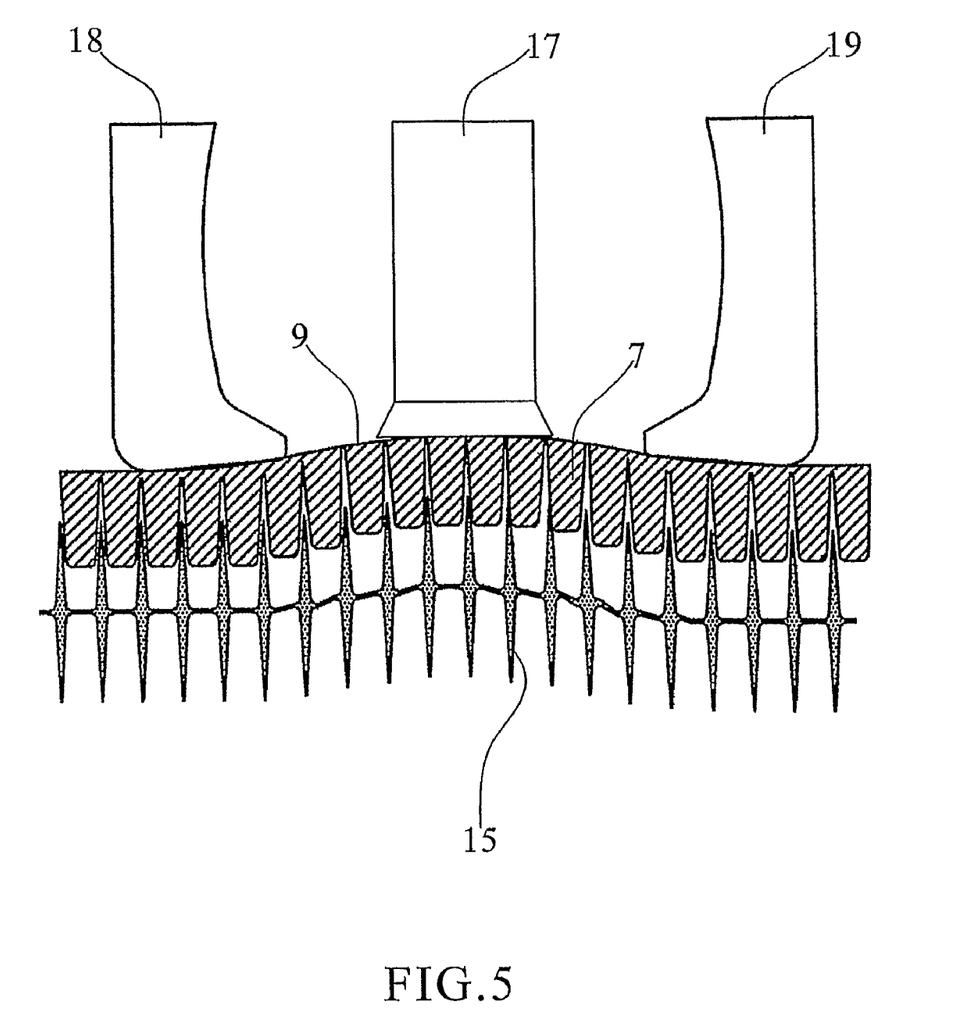

According to the method of the present invention, the separation of the resilient bands which constitute the alignments of silicone cores is carried out in a differentiated manner for the lower band and for the upper band. FIG. 2 shows the separation of the metal band of the lower part corresponding to the strip 10, simply by progressive curvature of the metal band, which curvature will depend on the end roller 6, progressively separating the band with respect to the already manufactured honeycomb 15. However, for the upper band separation is carried out by means of a plurality of assemblies of electromagnets such as those represented by the reference numbers 16, 16', 16" and which act on the upper band, creating pulsed magnetic fields which, in a progressive manner, effect the separation of the upper band with respect to the honeycomb 15, after the separation of the lower band. FIGS. 3, 4 and 5 show an electromagnet assembly formed by a central electromagnet core 17 and two supports, one on each side, 18 and 19, which permits the closure of the magnetic field from the lateral supports 18 and 19 to the core 17 which is slightly more separated than said laterals with respect to the strip 9, the magnetic flux passing through the strip 9 itself and through the silicone cores 7 which contain iron powder inside them in order to allow this function.

Figure 6:
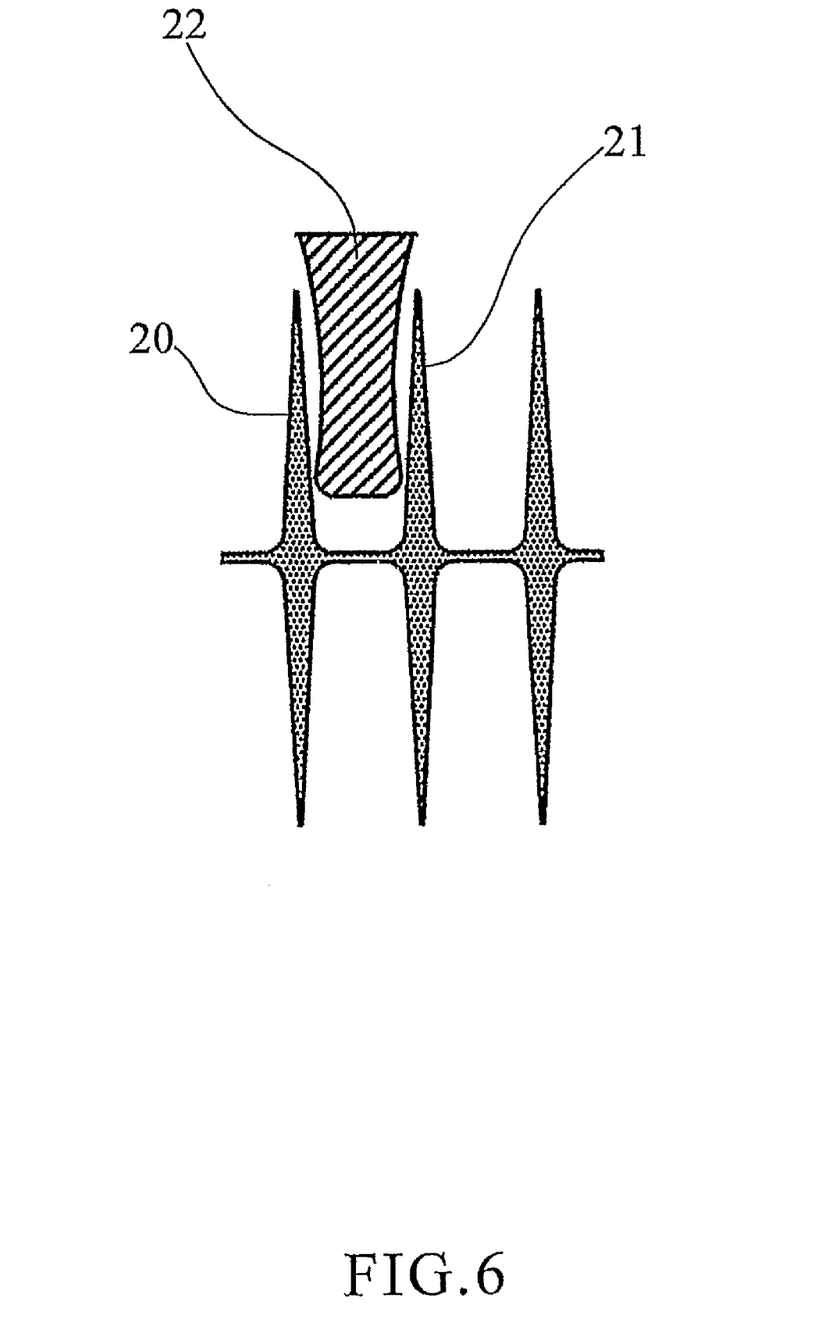
FIGS. 6, 7 and 8 show respective schematic views of the relative position of the cores and the honeycomb, corresponding respectively to the positions shown in FIGS. 3, 4 and 5.
Figure 7:
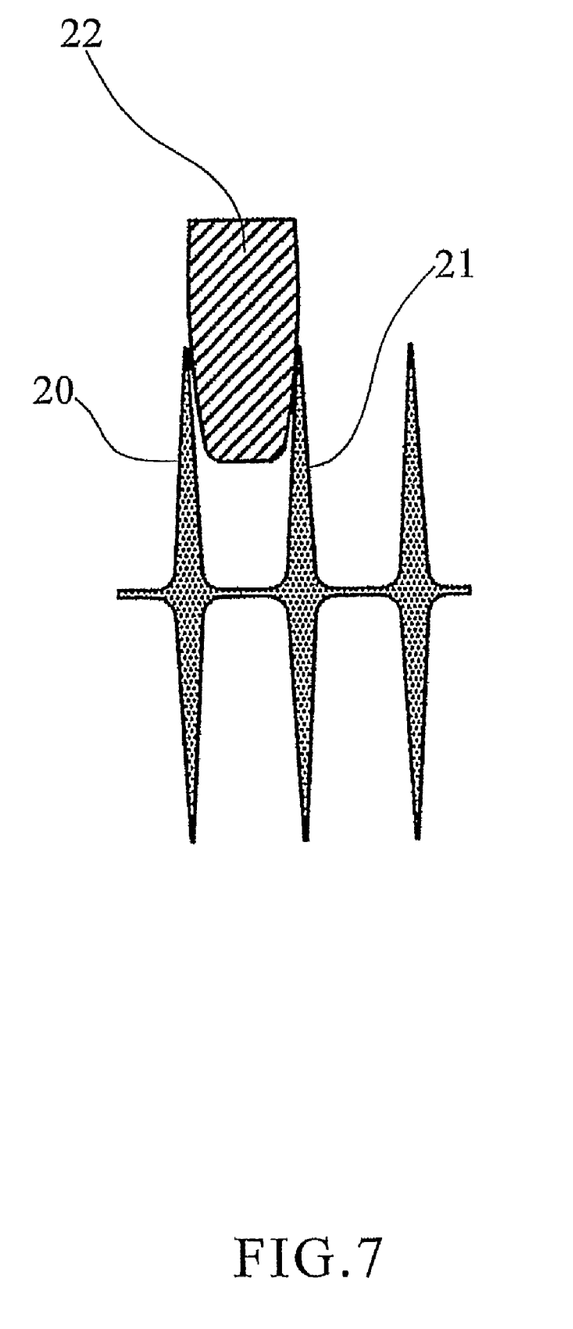
Figure 8:
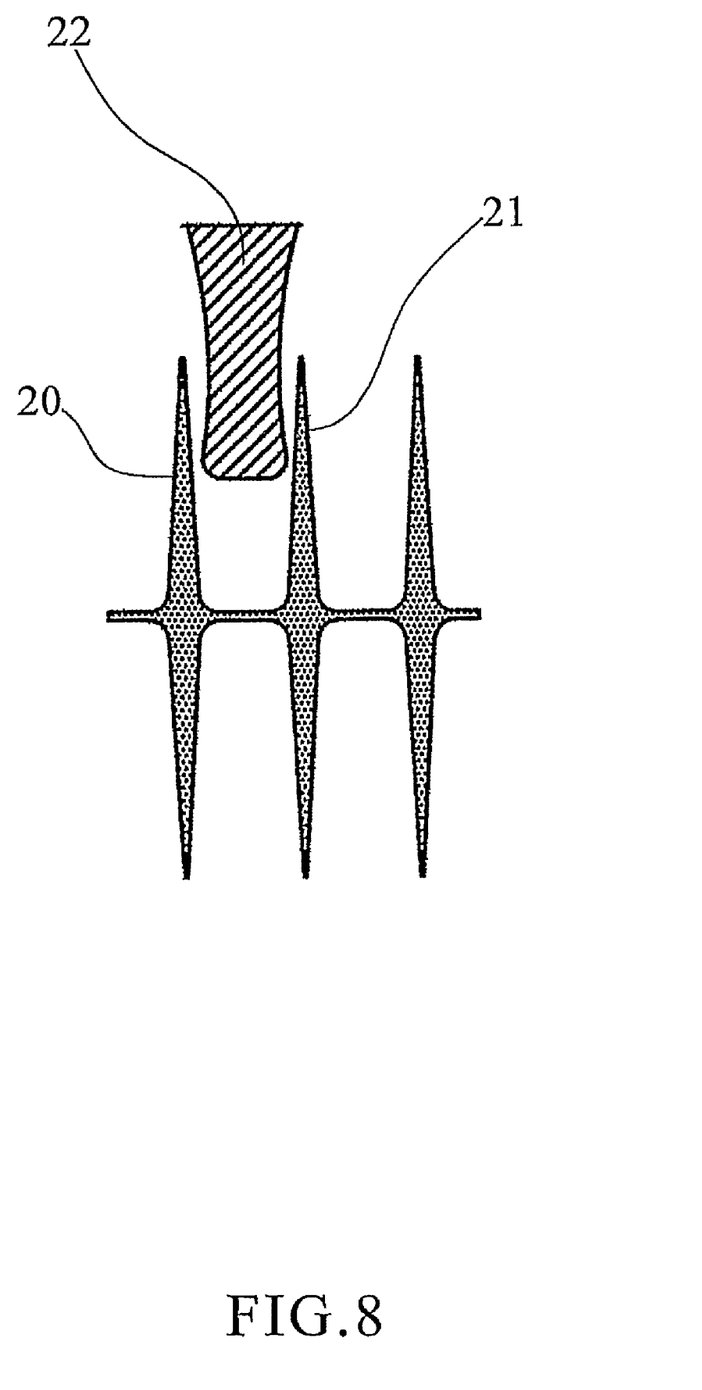

The curvature in the shape of short and relatively pronounced curves by the action of the pulsed magnetic fields progressively separates the bands of silicone cores from the newly formed honeycomb without breakage of the thin walls of the honeycomb. The progressive operation is shown in FIGS. 6, 7 and 8, in which is shown a fragment of the honeycomb in which two consecutive walls 20 and 21 and a core 22 can be seen, with FIG. 6 showing the narrowing of the core 22 when the curvature of the band is produced by the effect of the electromagnet, said core 22 recovering its normal shape in the rest state of the magnetic field, as shown in FIG. 7, which corresponds to FIG. 4, and being separated finally in a later cycle, as can be seen in FIG. 8, in which the core 22, on narrowing again, starting already from a position partially extracted from the honeycomb, succeeds in separating from the honeycomb.

In this way the result obtained is that the separation of the bands bearing the silicone cores takes place efficiently and progressively, without causing breakages in the walls of the honeycombs, which can be produced with more reduced thicknesses, thus entailing a considerable saving in raw material and approximating to a greater degree to the thickness of natural honeycombs.

Although the invention has been described with respect to the practical embodiment which has been shown, it will be understood that numerous variants may be introduced therein without departing from the scope of the invention if they correspond to the attached claims.

The invention claimed is:

1. A method for the manufacture of an apiculture honeycombs, comprising:
   a) feeding liquid wax into an assembly of two continuous bands of resilient silicone cores with separations between the cores to form cells and walls of the honeycomb;
   b) separating the bands of silicone cores from the honeycomb, wherein:
      i) a first band of silicone cores is separated from the honeycomb by simple curvature of the band away from the face of the honeycomb; and
      ii) a second band of silicone cores is removed from another face of the honeycomb by the progressive action of pulsed magnetic fields on that band, thereby effecting the progressive separation of the honeycomb from the silicone cores.

2. The method of claim 1, wherein the separation of the band by means of pulsed magnetic fields is carried out after the separation of the band corresponding to the opposite face of the honeycomb.

3. The method of claim 1, wherein the band that receives the pulsed magnetic fields is the upper band of the honeycomb, in its zone of advance after the zone of coincidence with the lower band.

4. A device for the manufacture of apiculture honeycombs, comprising an alignment of electromagnet assemblies disposed along a path of a band of resilient cores and that exert pulsed magnetic fields on the band of resilient cores to effect progressive separation of the band of cores from the honeycomb.

5. The device of claim 4, wherein the electromagnet assemblies have a central core and two lateral supports, the central core having greater separation from the band than the lateral supports in order to effect the transverse curvature of the band by the magnetic field.

6. The device of claim 4, wherein the resilient band includes a laminar metal strip on the face opposed to the magnets, and wherein the silicone cores contain iron powder.

* * * * *